Patented May 6, 1924.

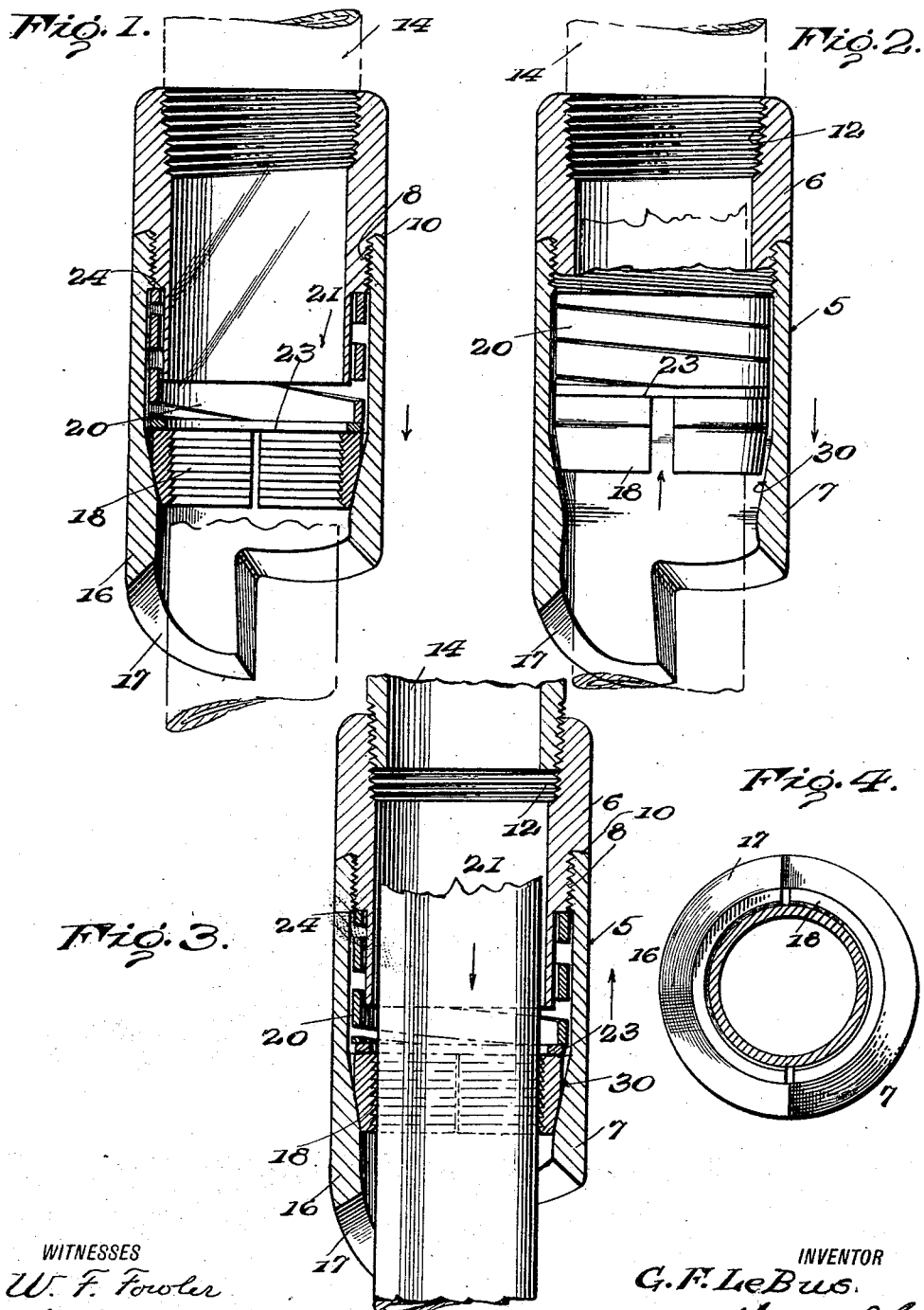

1,493,350

UNITED STATES PATENT OFFICE.

GEORGE F. LE BUS, OF ELECTRA, TEXAS.

OVERSHOT.

Application filed May 16, 1922. Serial No. 561,357.

*To all whom it may concern:*

Be it known that I, GEORGE F. LE BUS, a citizen of the United States, and resident of Electra, in the county of Wichita and State of Texas, have invented certain new and useful Improvements in Overshots, of which the following is a specification.

This invention relates to overshots especially adapted for use in deep wells.

Briefly stated, an important object of this invention is to provide a fishing tool having simple and reliable means for recovering lost pipe, tool joints, drill collars, rotary bits, underreamer lugs and the like.

A further object is to provide a fishing tool or overshot of the character specified to which the spring which urges the dogs in their advanced positions is fully protected so that when the tool encounters irregular objects the spring will not be broken or cut.

Also the invention forming the subject matter of this application aims to provide novel means whereby the lost objects are introduced into the overshot for engagement with the gripping dogs or jaws.

A further object is to provide a fishing tool which is of highly simplified construction, reliable in use and cheap to manufacture.

Other objects and advantages of the invention will be apparent during the course of the following description.

In the accompanying drawing forming a part of this application and in which like numerals are employed to designate like parts throughout the same, Figure 1 is a vertical sectional view through the improved fishing tool, a portion of a pipe to be recovered being shown slightly in advance of the tool, and the jaws being shown in their advanced positions, Figure 2 is a vertical sectional view through the tool, the jaws being shown in their retracted positions.

Figure 3 is a vertical sectional view through the tool, the jaws being shown in their advanced positions, and in engagement with an object to be removed.

Figure 4 is an end elevation of the improved tool.

In the drawing wherein for the purpose of illustration is shown a preferred embodiment of the invention the numeral 5 generally designates a tubular body or head which as illustrated in Figure 2 consists of upper and lower sections 6 and 7 respectively, the upper section being formed intermediate its ends with screw threads 8 which are engaged by the screw threads formed on the interior of the forward section. It will be seen that the upper section 6 is provided with an annular shoulder 10 which is engaged by the rear end of the forward section 7 so as to limit the movement of the forward section onto the rear section. It might be stated that when the sections 6 and 7 are assembled in the manner illustrated in the drawing the same form one rigid body which may be introduced into the well for recovering lost objects such as mentioned above.

In carrying out the invention the rear end of the section 6 is interiorly screw threaded as indicated at 12 for engagement with the forward end of a lowering pipe 14 by means of which the tool may be lowered into a well.

As illustrated particularly in Figs. 1 and 2 the forward portion of the body 5 is provided with a semi-circular lip 16 having its forward edge inclined inwardly as indicated at 17 so that when the object to be recovered is encountered it will be introduced into the body for engagement by the semi-circular jaws or dogs 18 of which there are two.

When the object to be recovered is thus introduced into the body it is engaged by the teeth of the semi-circular jaws 18 and the jaws are urged to their advanced position by means of a coiled spring 20.

In carrying out the invention the forward portion of the rear section is extended a substantial distance into the forward section and is reduced to define an annular extension 21, the said extension forming a reliable means for protecting the coiled spring 20. The annular extension 21 on the forward portion of the rear section 6 not only serves as a protecting means for the spring but also effectively limits the rearward movement of the semi-circular jaws 18.

The forward portion of the coiled spring 20 is engaged by a washer 23 mounted on the rear end of the jaws 18. The rear end of the coiled spring 20 is engaged with an annular shoulder 24 formed by reducing the forward portion of the rear section.

The washer 23 confined between the forward end of the coiled spring 20 and the rear sides of the jaws 18 positively prevents one of the convolutions of the spring from lodging between the jaws and the sides of the body and thereby rendering the device inoperative. Furthermore the annular washer 23 prevents one of the semi-circular jaws from moving rearwardly without the other jaw and possibly rendering the device inoperative.

Normally the semi-circular jaws 18 are urged to their advanced positions by means of coiled springs 20 and as the body has its bore tapered inwardly as indicated at 30 to provide shoulders the jaws normally occupy the positions illustrated in Figure 1. However, when an object to be recovered is introduced into the device the jaws are separated as illustrated in Figure 2 and the pressure of the coiled spring serves to urge the jaws firmly into engagement with the object.

It will be seen that the coiled spring is heavy enough to withstand the rough end of an object being fished for and when the object is encountered the dogs can move rearwardly against the sleeve and by subsequently rotating and spreading the device objects may be thoroughly gripped without damage to any part of the tool. This brings about a substantial saving in time and labor on the part of the operator.

The use of the semi-circular lip 16 is extremely desirable in wells having no casings as objects lost within such wells fall over on one side and bury themselves in the soft formation and with the ordinary plain bottom tools it is impossible to introduce the lost object into the tool for engagement by the gripping members. It will be seen also that the transversely curved or semi-circular lip 16 has its forward portion curved longitudinally as well as inclined inwardly so as to effectively introduce the objects to be recovered into the body.

Having thus described the invention, what I claim is:—

1. A fishing tool comprising a body consisting of a pair of sections, one of which is mounted into the other section and is reduced exteriorly at a point spaced rearwardly from its forward end to define an annular shoulder and an annular extension cooperating with the other section to define an annular chamber, a coil spring received in said annular chamber and extending beyond the same, a plurality of jaws engaged by said coil spring, said annular extension being in the path of travel of and being adapted to be engaged by said jaws to limit the rearward movement of the same, and an arcuate rib formed on the forward end of the body and having its forward end curved about an axis extending transversely of the longitudinal axis of the body.

2. A fishing tool comprising a tubular body, separate jaws arranged within the body and adapted for gripping an object to be recovered, a coiled spring urging the jaws into engagement with an object to be recovered, and an arcuate lip secured to the forward end of the body and having its forward end curved about an axis extending transversely of the longitudinal axis of the body, the curved forward end of said lip also being beveled inwardly to direct objects into the body.

GEORGE F. LE BUS.